(12) United States Patent
Isomura (10) Patent No.: US 8,402,771 B2
(45) Date of Patent: Mar. 26, 2013

(54) GAS TURBINE ENGINE (75) Inventor: Kosuke Isomura, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 13/526,763

(22) Filed: Jun. 19, 2012

(65) Prior Publication Data

US 2012/0297793 A1  Nov. 29, 2012

Related U.S. Application Data (62) Division of application No. 12/601,137, filed as application No. PCT/JP2008/058499 on May 7, 2008, now Pat. No. 8,225,615.

(30) Foreign Application Priority Data

May 22, 2007  (JP) .................................. 2007/135863

(51) Int. Cl.
*F02C 7/12* (2006.01)

(52) U.S. Cl. ................. 60/806; 60/805; 60/782; 60/785; 60/795; 60/39.83; 415/115; 415/116; 415/117; 415/180; 416/95; 416/96 R; 416/97 R (58) Field of Classification Search ................. 60/806, 60/805, 782, 785, 795, 39.83; 415/115–117, 415/180; 416/95, 96 R, 97 R
See application file for complete search history.

(56) References Cited

U.S. PATENT DOCUMENTS

| 3,896,875 A | 7/1975 | Bolger |
| 3,994,630 A | 11/1976 | Rodgers |
| 4,300,349 A | 11/1981 | Heckel |
| 5,605,045 A | 2/1997 | Halimi et al. |
| 6,195,979 B1 * | 3/2001 | Fukuyama ..................... 60/806 |
| 6,510,684 B2 * | 1/2003 | Matsunaga ................ 60/39.511 |
| 7,521,815 B2 * | 4/2009 | Lee et al. ......................... 290/52 |
| 2002/0012588 A1 | 1/2002 | Matsunaga et al. |

FOREIGN PATENT DOCUMENTS

| JP | 55-19533 | 4/1980 |
| JP | 09-033035 | 2/1997 |
| JP | 11-062624 | 3/1999 |
| JP | 2001-342849 | 12/2001 |
| JP | 2001-527613 | 12/2001 |
| JP | 2006-292362 | 10/2006 |
| WO | 2006/043734 A1 | 4/2006 |

OTHER PUBLICATIONS

International Search Report issued in corresponding application No. PCT/JP2008/058499, completed Jul. 3, 2008 and mailed Jul. 15, 2008.

Notice of Allowance dated Mar. 26, 2012 in parent U.S. Appl. No. 12/601,137.

* cited by examiner

*Primary Examiner* — William H Rodriguez
*Assistant Examiner* — Craig Kim
(74) *Attorney, Agent, or Firm* — Griffin & Szipl, P.C.

(57) ABSTRACT

A combustor (14) is placed next to a turbine (16), on the side opposite a compressor (12). A heat insulation device (20) for reducing the transmission of heat from the high-temperature side to the low-temperature side is provided between the combustor/turbine and the compressor. A connection shaft (18) has an axial hole (18a) open on the inlet side of the compressor and axially extending to near a turbine impeller, and also has a radial hole (18b) open near the turbine impeller to the outside of the connection shaft and radially extending to be in communication with the axial hole.

2 Claims, 6 Drawing Sheets

GAS TURBINE ENGINE

This is divisional application of U.S. patent application Ser. No. 12/601,137, which was filed on Nov. 20, 2009, which is the National Phase Application in the United States of International Patent Application No. PCT/JP2008/058499 filed May 7, 2008, which claims priority on Japanese Patent Application No. 135863/2007, filed May 22, 2007. The entire disclosures of the above patent applications are hereby incorporated by reference.

BACKGROUND OF THE INVENTION

1. Technical Field of the Invention

The present invention relates to a gas turbine engine, in which a compressor impeller is connected to a turbine impeller via a connection shaft, or a compressor and a turbine casing are adjacent to each other or connected to each other.

2. Description of the Related Art

The basic cycle of a gas turbine is the Brayton cycle, and the thermal efficiency thereof changes with an increase in pressure ratio and temperature ratio. For this reason, it is very important to prevent the heat generated at a high-temperature part (combustor) from being transmitted to a low-temperature part (compressor) in view of insuring the cycle performance. It becomes of particular importance in the case the gas turbine engine is downsized. The reason is that it is necessary to achieve a temperature difference between the high-temperature part and the low-temperature part which is similar to a large-sized machine, at shorter distance.

Also, in the case where the gas turbine is used to drive an electric generator, the heat insulation between the high-temperature part of the gas turbine and the electric generator is important. The reason is that, in a permanent magnet of the electric generator, the maximum allowable temperature to function as a magnet according to the Curie point is limited to a low level.

For example, a conventional heat isolation means for reducing an amount of heat conduction from the high-temperature to the low-temperature is disclosed in Patent Documents 1 and 2.

Figure 1:
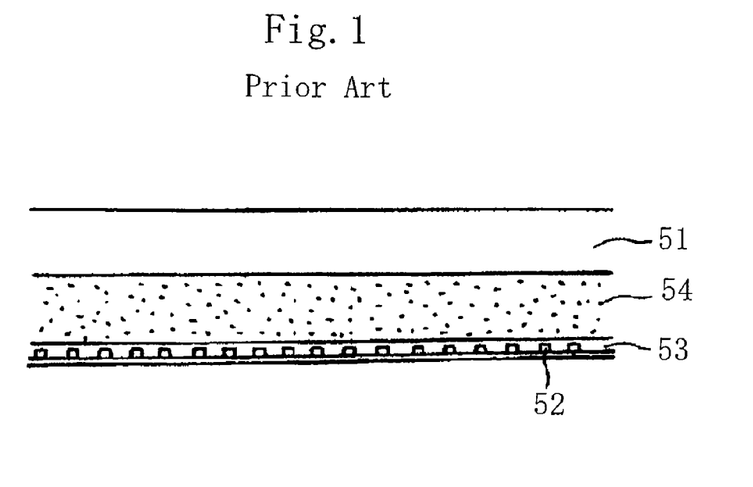
FIG. 1 is a schematic view of a heat insulation device for use in a start-up combustor shown in Patent Document 1.

As shown in FIG. 1, a start-up combustor disclosed in Patent Document 1 includes a heat isolation plate 53 engaged on a gas passage in an inside of a casing 51 and having a cooling fluid passage 52, and a heat-retaining layer 54 of a constant thickness provided between the heat isolation plate 53 and an inner surface of the case and filled with an insulation filling therein, to suppress heat input of radiant heat to the casing 51.

Figure 2:
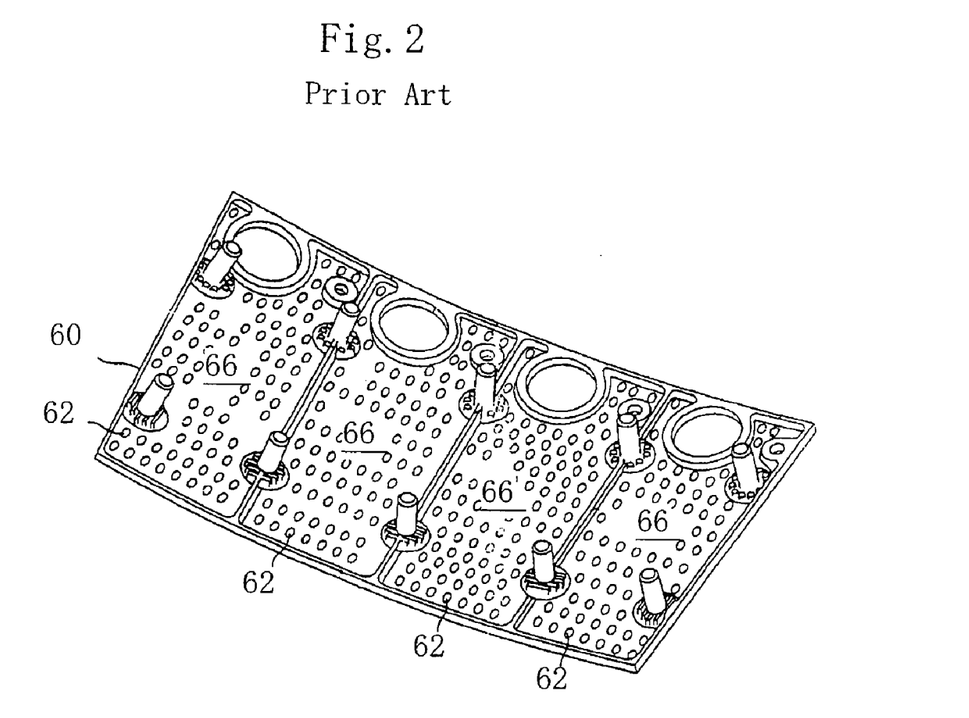
FIG. 2 is a schematic view of a heat shield panel shown in Patent Document 2.

As shown in FIG. 2, the heat isolation panel (front heat isolation panel) 60 disclosed in Patent Document 2 includes a high-temperature side part and a low-temperature side part which can be utilized in a combustor for a gas turbine engine, and the low-temperature side part is provided with at least one independent cooling chamber 66. Each cooling chamber 66 is provided with a plurality of film cooling bores 62, through which a refrigerant such as air flows from the low-temperature side part to the high-temperature side part.

Patent Document 1: Japanese Unexamined Patent Application Publication No. H9-33035
Patent Document 2: Japanese Unexamined Patent Application Publication No. 2006-292362

In the case where the compressor impeller compressing the air is directly connected to the turbine impeller rotated by the hot gas via a connection shaft, there is a problem that since a lot of heat is conducted from the hot turbine impeller to the compressor impeller via the connection shaft, the air in the compressor is heated, and thus the performance of the compressor is deteriorated.

Also, in the case where the combustor for burning the fuel in the pressurized air compressed by the compressor is detached from the compressor and then is installed to a rear side (opposite to the compressor) of the turbine, since the combustion gas generated by the combustor is high temperature, for example, 1000° C. or more, the hot gas is introduced into the turbine. Therefore, the combustor and the turbine are hot, so that a lot of heat is conducted to from the high-temperature part to the compressor side.

In particular, in the case where the compressor and the turbine casing are adjacent to each other or connected to each other in order to downsize the gas turbine engine, the amount of heat conductivity is increased, and the performance of the compressor and the performance of the gas turbine may be deteriorated.

In case of combining and miniaturizing the gas turbine engine and the electric generator, it is preferable that the electric generator is interposed between the compressor and the turbine. In this instance, however, since, in the permanent magnet of the electric generator, the maximum allowable temperature working as a magnet according to the Curie point is low (e.g., 100° C.), it is necessary to further improve the performance of heat insulation thereof.

SUMMARY OF THE INVENTION

The invention is devised to solve the above-described problems. In other words, an object of the invention is to provide a gas turbine engine capable of significantly reducing conduction of heat from a combustor and a turbine to a compressor and thus improving the thermal efficiency, in the case where a compressor impeller is connected to a turbine impeller via a connection shaft, or the compressor and a turbine casing are adjacent to each other or connected to each other.

According to an aspect of the invention, there is provided a gas turbine engine including a compressor for compressing air, a combustor for burning a fuel in pressurized air compressed by the compressor to generate hot gas, and a turbine rotated by the hot gas, in which the combustor is installed adjacent to the turbine opposite to the compressor, and a heat insulation device is installed between the combustor/turbine and the compressor to reduce conduction of heat from a high-temperature part side to a low-temperature part side.

According to a preferred embodiment of the invention, the heat insulation device includes a heat-insulation heat exchange plate for partitioning the combustor/turbine and the compressor, and the heat-insulation heat exchange plate is constituted by a low-temperature side outer plate, a high-temperature side outer plate, and a flow path forming plate for partitioning an inside of the heat-insulation heat exchange plate, in which the pressurized air compressed by the compressor flows in from a periphery, flows in the inside along the low-temperature side outer plate, flows in the high-temperature side at an inner end portion, flows outwardly along the high-temperature side outer plate, and is discharged from the periphery to the combustor.

Also, the heat insulation device includes a low-contact partition panel of a small contact area for partitioning the combustor/turbine and the compressor, and the low-contact partition panel includes a support plate contacting one side of the low-temperature side and the high-temperature side, and a plurality of bosses dispersed on the support plate and contacting the other side of the low-temperature side and the high-temperature side, in which the total contact area of the bosses is set small enough to reduce heat conductivity.

Also, the heat insulation device includes a low-heat conductivity plate of low heat conductivity for partitioning the combustor/turbine and the compressor.

According to another aspect of the invention, there is provided a gas turbine engine including a compressor for compressing air, a combustor for burning a fuel in pressurized air compressed by the compressor to generate hot gas, and a turbine rotated by the hot gas, in which a compressor impeller of the compressor is connected to a turbine impeller of the turbine via a connection shaft, and the connection shaft is provided with an axial hole opened towards the inlet side of the compressor and axially extending to the vicinity of the turbine impeller, and a radial hole opened towards an outside of the connection shaft adjacent to the turbine impeller and radially extending, the radial hole being in communication with the axial hole.

Also, there is provided a gas turbine engine including a compressor for compressing air, a combustor for burning a fuel in pressurized air compressed by the compressor to generate hot gas, and a turbine rotated by the hot gas, characterized by including a gas guide plate, interposed between the combustor and the turbine, for guiding the hot gas to the turbine, the gas guide plate including a radiation fin for preheating the pressurized air.

With the configuration of the invention, the heat insulation device (the heat-insulation heat exchange plate, the low-contact partition plate and the low-heat conductivity plate) for reducing the conduction of heat from the combustor and the turbine to the compressor is interposed between the combustor/turbine and the compressor, thereby significantly reducing the conduction of heat from the combustor and the turbine to the compressor.

Also, the connection shaft connecting the compressor impeller and the turbine impeller is provided with the axial hole opened towards the inlet side of the compressor and axially extending to the vicinity of the turbine impeller, and the radial hole opened towards an outside of the connection shaft adjacent to the turbine impeller and radially extending, the radial hole being in communication with the axial hole. By the centrifugal force generated by the high-speed rotation of the connection shaft, therefore, the cold air (e.g., 30° C.) of the inlet portion of the compressor can be introduced into the inside of the connection shaft via the axial hole and the radial hole, thereby directly cooling the inside of the connection shaft by using the cold air.

In addition, the gas guide plate is interposed between the combustor and the turbine to guide the hot gas to the turbine. The gas guide plate is provided with the radiation fins for preheating the pressurized air. Therefore, the gas guide plate heated by the hot gas is cooled by the pressurized air. At the same time, the combustion efficiency can be improved in the combustor preheating the pressurized air.

DESCRIPTION OF THE PREFERRED EMBODIMENT

A preferred embodiment of the invention will now be described with reference to the accompanying drawings. In the drawings, common parts are designated by the same reference numerals, and the description thereof will be omitted herein.

Figure 3:
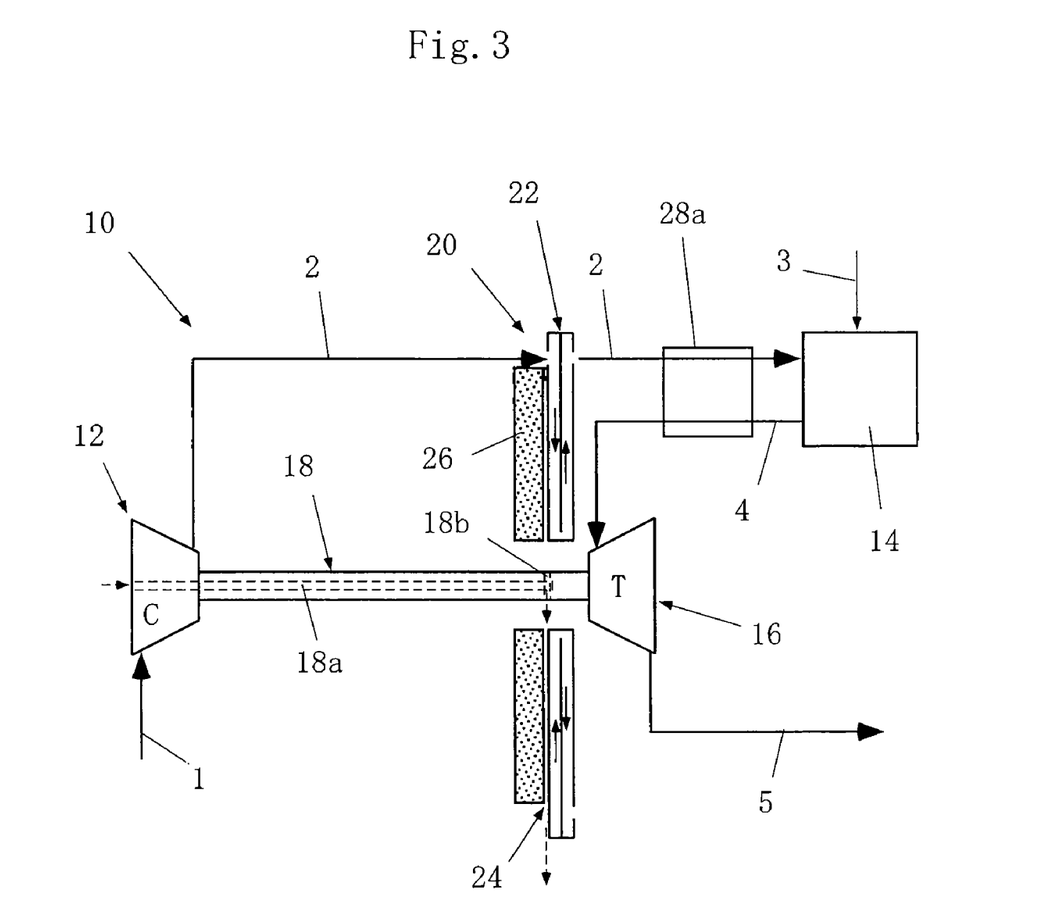
FIG. 3 is a schematic view illustrating the whole configuration of a gas turbine engine according to the invention.

FIG. 3 is a schematic view illustrating the whole configuration of a gas turbine engine according to the invention.

In FIG. 3, a gas turbine engine 10 according to the invention includes a compressor 12 for compressing air 1, a combustor 14 for burning a fuel 3 in the pressurized air 2 compressed by the compressor 12 to generate hot gas 4, and a turbine 16 rotated by the hot gas 4.

The combustor 14 is installed adjacent to the turbine 16 opposite to the compressor 12.

In FIG. 3, the gas turbine engine 10 according to the invention also includes a heat insulation device 20. The heat insulation device 20 is installed between the combustor 14/the turbine 16 and the compressor 12 to reduce the conduction of the heat from the combustor 14 and the turbine 16 to the compressor side.

Figure 4:
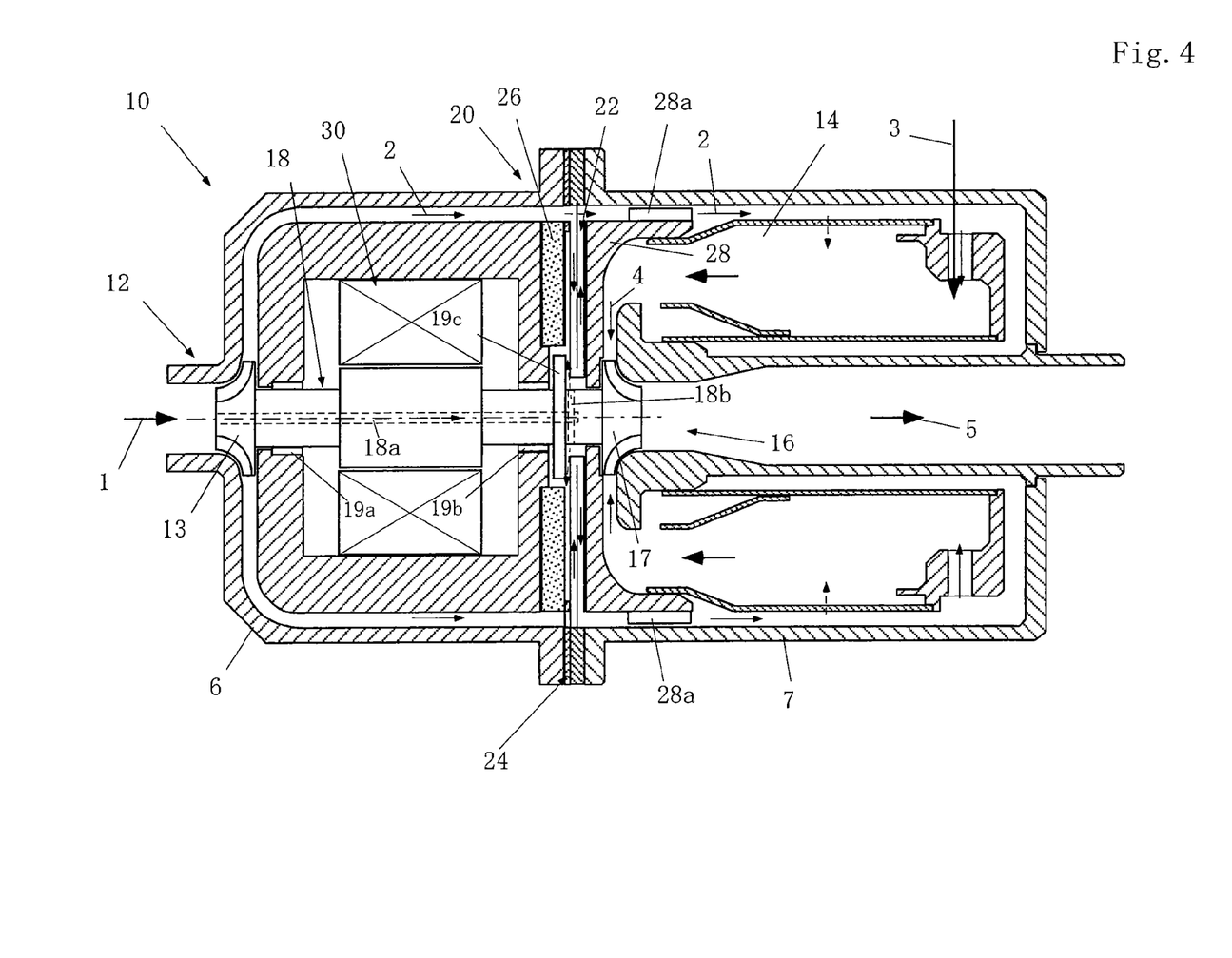
FIG. 4 is a diagram illustrating whole configuration of an illustrative embodiment of a gas turbine engine according to the invention.

FIG. 4 is a diagram illustrating whole configuration of an illustrative embodiment of a gas turbine engine according to the invention.

In FIG. 4, the combustor 14 is installed adjacent to the turbine 16, and encloses the turbine 16 at the side opposite to the compressor 12, so that exhaust gas 5 is axially discharged from a center portion.

In this embodiment, the compressor 12 is a centrifugal compressor, and the turbine 16 is a radial flow turbine. The invention is not limited thereto, and an axial flow compressor, an axial flow turbine, a diagonal flow compressor or a diagonal turbine may be used.

In FIG. 4, reference numeral 6 refers to a compressor casing, 7 refers to a turbine casing. In order to miniaturize the gas turbine engine, the compressor casing 6 and the turbine casing 7 are connected to each other.

The compressor impeller 13 in the compressor 12 is directly connected to the turbine impeller 17 in the turbine 16 via a connection shaft 18. Meanwhile, the connection shaft 18 is not limited to the direct connection, but the compressor impeller and the turbine impeller may be connected to each other via, for example, a reduction unit.

In addition, an electric generator 30 (composed of a rotor and a stator) is interposed between the compressor 12 and the turbine 16. In the invention, the electric generator 30 is not an indispensable part, and may be omitted.

In FIG. 4, the connection shaft 18 is supported in a radial direction and a thrust direction by means of a radial bearing 19a of the compressor side, a radial bearing 19b of the turbine side, and a thrust bearing 19c of the turbine side.

Also, the connection shaft 18 is provided with an axial hole 18a opened towards the inlet side of the compressor 12 and axially extending to the vicinity of the turbine impeller, and a radial hole 18b opened towards the outside of the connection shaft adjacent to the turbine impeller and radially extending, the radial hole being in communication with the axial hole 18a.

Although the radial hole 18b is positioned at the turbine side rather than the thrust bearing 19c, the radial hole may be positioned at the compressor side.

With the above configuration, cold air (e.g., 30° C.) at the inlet portion of the compressor 12 can flow through the axial hole 18a and the radial hole 18b, and flow from the inlet side of the compressor 12 to the vicinity of the turbine impeller through an inside of the connection shaft 18 by the centrifugal force resulting from high-speed rotation of the connection shaft 18, thereby directly cooling the connection shaft 18 from inside thereof.

In FIG. 4, the heat insulation device 20 is constituted by a heat-insulation heat exchange plate 22, a low-contact partition panel 24, and a low-thermal conductivity plate 26.

Figure 5:
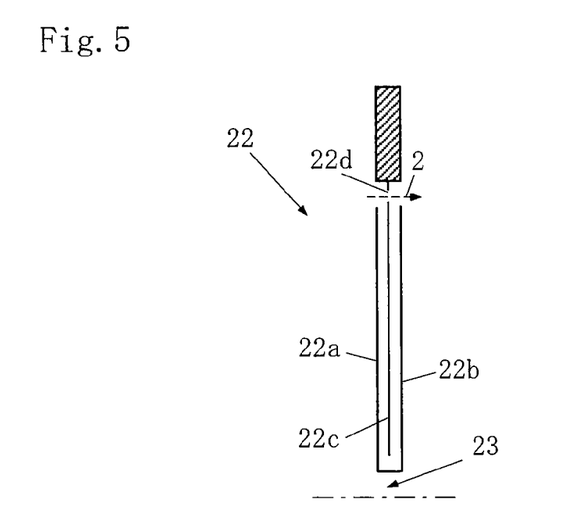
FIG. 5 is a cross-sectional view schematically illustrating a heat-insulation heat exchange plate.

FIG. 5 is a cross-sectional view schematically illustrating a heat-insulation heat exchange plate 22.

The heat-insulation heat exchange plate 22 is a doughnut-shaped disc with a center bore 23, through which the connection shaft 18 passes. The heat-insulation heat exchange plate 22 is constituted by a low-temperature side outer plate 22a, a high-temperature side outer plate 22b, and a flow path forming plate 22c for partitioning the inside of the heat-insulation heat exchange plate 22. The heat-insulation heat exchange plate 22 partitions the combustor/turbine and the compressor separately.

The outer surface (on a left side of FIG. 5) of the low-temperature side outer plate 22a comes into close contact with the low-contact partitioning panel 24 in this embodiment. Also, the outer surface (on the right side of FIG. 5) of the high-temperature side outer plate 22b comes into close contact with a gas guide plate 28 for guiding the hot gas 4 to the turbine 17 in this embodiment. The low-temperature side outer plate 22a and the high-temperature side outer plate 22b are connected to each other by the center bore portion, through which the connection shaft 18 passes, to prevent leakage of the pressurized air therein.

The flow path forming plate 22c is positioned by a support member (e.g., a corrugate), which is not shown, between the low-temperature side outer plate 22a and the high-temperature side outer plate 22b. The pressurized air compressed by the compressor 12 flows in from the periphery of the low-temperature side outer plate 22a, flows in the plate along the low-temperature side outer plate 22a, flows in the high-temperature side at the inner end portion (outside of the center bore), flows outwardly along the high-temperature side outer plate 22b, and is discharged from the periphery of the high-temperature side outer plate 22b to the combustor side.

The flow path forming plate 22c is provided with fine pores 22d, as shown in FIG. 5, to directly pass a part of the pressurized air 2 compressed by the compressor 12 to the combustor side. The size and number of the fine pores 22d are set in such a way that the amount of air required for cooling the heat-insulation heat exchange plate 22 flows therethrough.

With this configuration, the inside of the heat-insulation heat exchange plate 22 is cooled by the pressurized air 2 compressed by the compressor 12. A heat insulation layer of air is formed between the low-temperature side outer plate 22a and the high-temperature side outer plate 22b of the heat-insulation heat exchange plate 22 to significantly reduce the conduction of heat from the combustor 14 and the turbine 16 to the compressor side. It is known that the heat insulation layer of air has very low heat transfer rate as compared with that of a solid layer.

Since the pressurized air 2 heated by cooling the heat-insulation heat exchange plate 22 is supplied to the combustor 14, the ignition performance of the fuel 3 in the combustor 14 can be enhanced, and thus the combustion efficiency can be improved.

Figure 6:
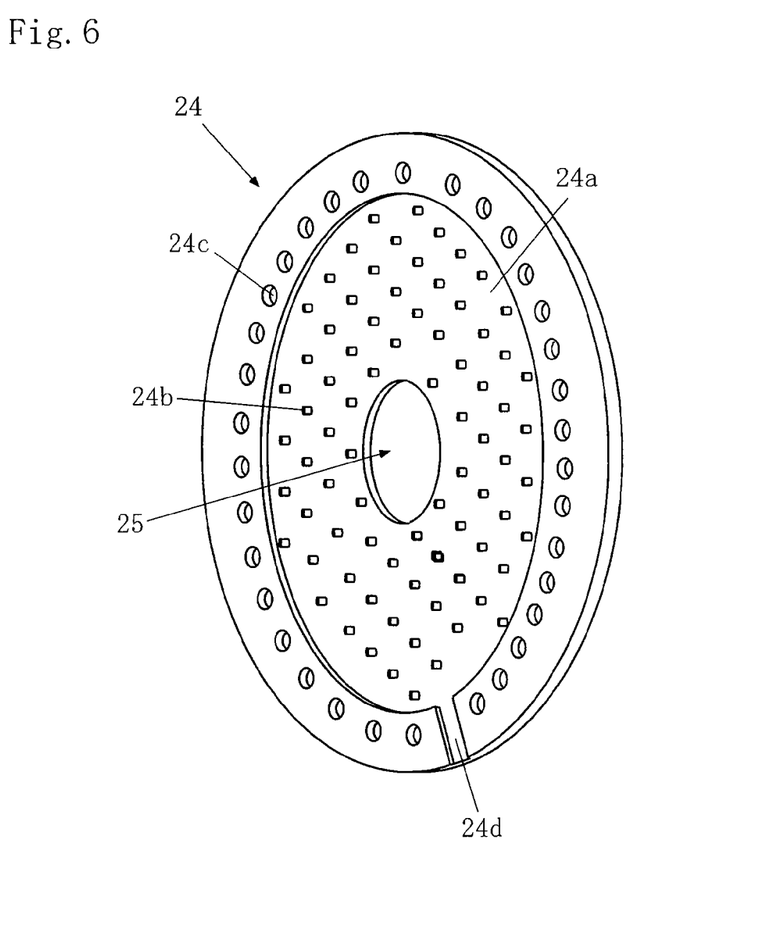
FIG. 6 is a perspective view illustrating an example of a low-contact partition panel.
Figure 7:
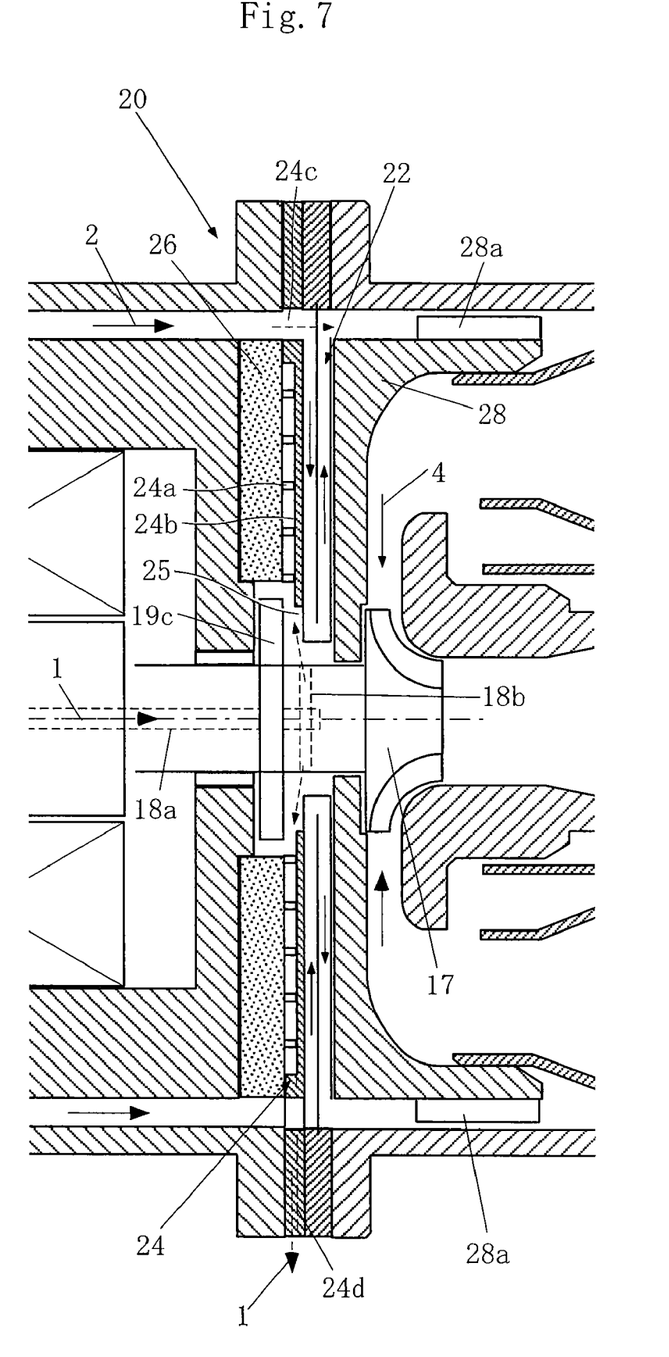
FIG. 7 is a partial enlarged view of the low-contact partition panel shown in FIG. 4 to illustrate an arrangement state of the low-contact partition panel.

FIG. 6 is a perspective view illustrating an example of a low-contact partition panel 24. FIG. 7 is a partial enlarged view of the low-contact partition panel 24 shown in FIG. 4 to illustrate an arrangement state of the low-contact partition panel.

The low-contact partition panel 24 is a plate of a small contact area for partitioning the combustor 14/turbine 16 and the compressor 12 separately.

As schematically shown in FIGS. 6 and 7, the low-contact partition panel 24 includes a support plate 24a contacting one side of the low-temperature side and the high-temperature side (the low-temperature side outer plate 22a in this embodiment), and a plurality of bosses 24b dispersed on the support plate 24a and contacting the other side of the low-temperature side and the high-temperature side (the low-heat conductivity plate 26 in this embodiment). The total contact area of the bosses 24b is set small enough to reduce the heat conductivity.

The low-contact partition panel 24 is a doughnut-shaped disc with a center bore 25, through which the connection shaft 18 passes. By the centrifugal force generated by the rotation of the connection shaft 18 at the center thereof, the cold air 1 (e.g., 30° C.) is introduced from the inlet side of the compressor 12 to the vicinity of the turbine impeller, and flows through gaps between the bosses 24b to form an air layer.

In addition, as shown in FIGS. 6 and 7, the low-contact partition panel 24 is provided on the periphery thereof with a plurality of through-holes 24c in a circumferential direction, through which the pressurized air 2 compressed by the compressor passes. Also, the low-contact partition panel 24 is provided on the periphery thereof with an exhaust flow path 24d for outwardly discharging the air 1 introduced through the gaps of the respective bosses 24b. In this embodiment, the exhaust flow path 24d is formed in the shape of a groove, but a radial through-hole may be formed.

The exhaust passage of the cold air 1 is not limited to the above configuration, and may be discharged through other portions (e.g., the compressor casing).

With the above configuration, the low-contact partition panel 24 has a small contact area and a heat insulation layer of air, thereby significantly reducing the conduction of heat through the low-contact partition panel 24.

The low-heat conductivity plate 26 is a heat insulation plate partitioning the combustor 14/turbine 16 and the compressor 12 separately. The low-heat conductivity plate 26 is made of, for example, a porous ceramic plate having very low heat conductivity, as compared with that of a material constituting the combustor. Also, the conduction of heat from the high-temperature side to the low-temperature side can be reduced by this configuration.

The heat-insulation heat exchange plate 22, the low-contact partition plate 24, and the low-heat conductivity plate 26 are not indispensable parts, and a part of them may be omitted as far as the desired heat insulation is satisfactorily.

In FIG. 4, the gas turbine engine 10 according to the invention also includes the gas guide plate 28 between the combustor 14 and the turbine 16, the gas guide plate guiding the hot gas 4 to the turbine 16 (the turbine impeller 17). The gas guide plate 28 is placed adjacent to a rear surface of the turbine impeller 17 and the connection shaft 18, and has a seal, for example, a labyrinth seal, for preventing the hot gas from flowing from the turbine impeller 17 to the compressor side.

Figure 8:
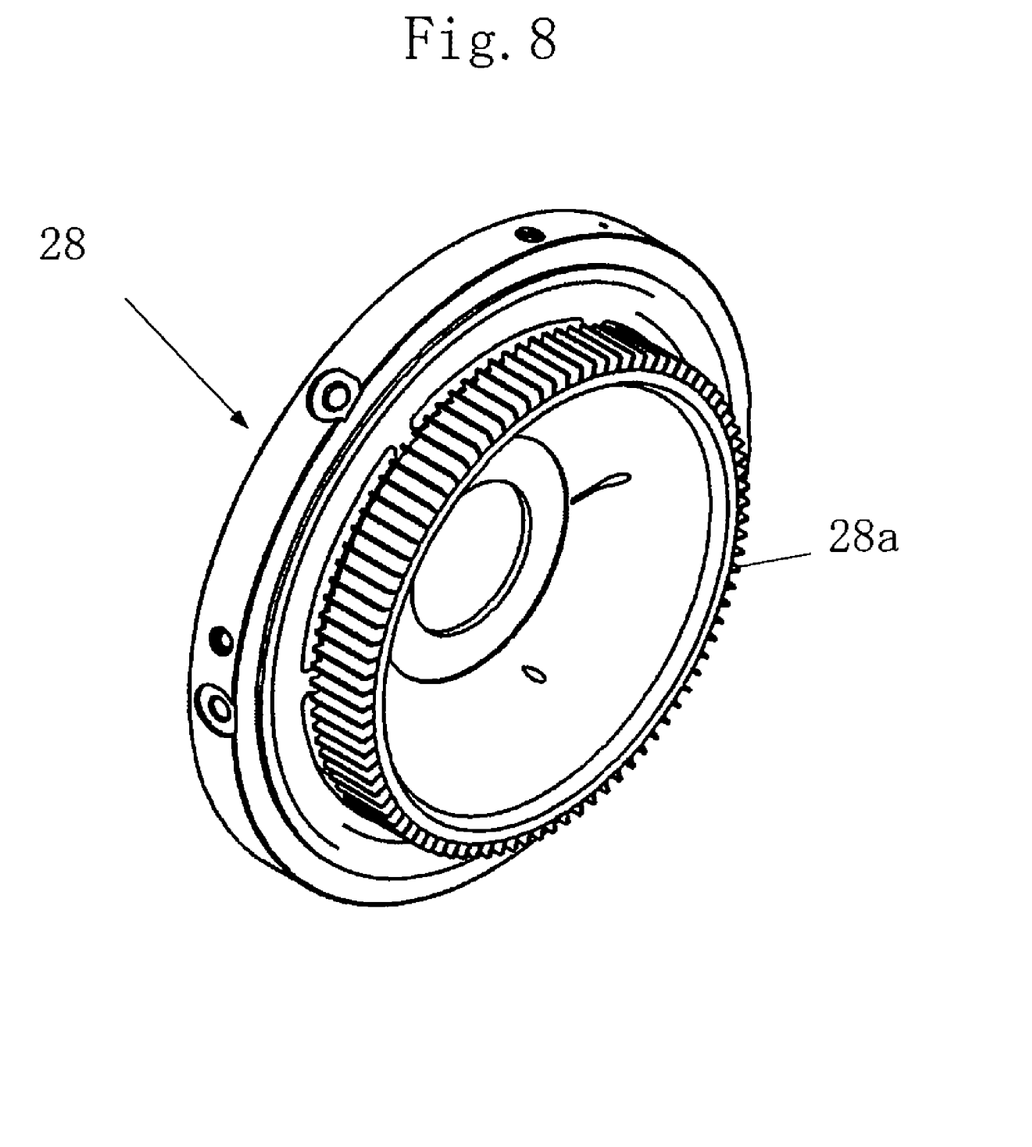
FIG. 8 is a perspective view schematically illustrating a gas guide plate.

FIG. 8 is a perspective view schematically illustrating a gas guide plate 28. The gas guide plate 28 has a flow path inner surface of the pressurized air 2 formed in the circumference thereof, and is provided on the circumference thereof with a plurality of radiation fins 28a which are extended in an axial direction.

With this configuration, the gas guide plate 28 heated by the hot gas 4 is cooled by the pressurized air 2. At the same time, the combustion efficiency of fuel can be improved in the combustor 14 preheating the pressurized air 2.

With this configuration of the invention, as described above, the heat insulation device 20 (the heat-insulation heat exchange plate 22, the low-contact partition plate 24 and the low-heat conductivity plate 26) for reducing the conduction of heat from the combustor and the turbine to the compressor is interposed between the combustor 14/turbine 16 and the compressor 12, thereby significantly reducing the conduction of heat from the combustor and the turbine to the compressor.

Also, by the centrifugal force generated by the high-speed rotation of the connection shaft 18, the cold air 1 (e.g., 30° C.) of the inlet portion of the compressor can be introduced into the inside of the connection shaft 18 via the axial hole 18a and the radial hole 18b, thereby directly cooling the inside of the connection shaft 18 by using the cold air.

According to the radiation fins 28a, the gas guide plate 28 heated by the hot gas 4 is cooled by the pressurized air 2, so that the combustion efficiency can be improved in the combustor preheating the pressurized air 2.

The invention is not limited to the embodiment described above. It is to be understood that the components of the invention may be variously modified without departing from the spirit or scope of the invention.

The invention claimed is:

1. A gas turbine engine including:
   (a) a compressor for compressing air;
   (b) a combustor for burning a fuel in pressurized air compressed by the compressor to generate hot gas; and
   (c) a turbine rotated by the hot gas, wherein
   the combustor is installed adjacent to the turbine opposite to the compressor, and
   a heat insulation device is installed between the combustor and the compressor, and between the turbine and the compressor, to reduce conduction of heat from a high-temperature side to a low-temperature side of the gas turbine engine,
   wherein the heat insulation device includes a heat-insulation heat exchange plate that includes
   i. a low-temperature side outer plate;
   ii. a high-temperature side outer plate; and
   iii. a flow path forming plate for partitioning an inside of the heat-insulation heat exchange plate, wherein the pressurized air compressed by the compressor flows in the flow path forming plate from a periphery, wherein the pressurized air flows in the inside along the low-temperature side outer plate, and the pressurized air flows in the high-temperature side at an inner end portion, and the pressurized air flows outwardly along the high-temperature side outer plate, and is discharged from the periphery to the combustor,
   wherein a compressor impeller of the compressor is connected to a turbine impeller of the turbine via a connection shaft; and
   the connection shaft is provided with an axial hole opened towards an inlet side of the compressor and that axially extends to a vicinity of the turbine impeller, and a radial hole opened towards an outside of the connection shaft adjacent to the turbine impeller and extending radially, wherein the radial hole is in communication with the axial hole.

2. A gas turbine engine including:
   (a) a compressor for compressing air;
   (b) a combustor for burning a fuel in pressurized air compressed by the compressor to generate hot gas; and
   (c) a turbine rotated by the hot gas, wherein
   the combustor is installed adjacent to the turbine opposite to the compressor, and
   a heat insulation device is installed between the combustor and the compressor, and between the turbine and the compressor, to reduce conduction of heat from a high-temperature side to a low-temperature side of the gas turbine engine,
   wherein the heat insulation device includes a heat-insulation heat exchange plate that includes
   i. a low-temperature side outer plate;
   ii. a high-temperature side outer plate; and
   iii. a flow path forming plate for partitioning an inside of the heat-insulation heat exchange plate, wherein the pressurized air compressed by the compressor flows in the flow path forming plate from a periphery, wherein the pressurized air flows in the inside along the low-temperature side outer plate, and the pressurized air flows in the high-temperature side at an inner end portion, and the pressurized air flows outwardly along the high-temperature side outer plate, and is discharged from the periphery to the combustor,
   wherein a gas guide plate is interposed between the combustor and the turbine for guiding the hot gas to the turbine, and the gas guide plate includes a radiation fin for preheating the pressurized air.

* * * * *